United States Patent Office 3,164,585
Patented Jan. 5, 1965

3,164,585
HYDRAZONES OF CYCLICHALOVINYL-
ALDEHYDES
Leo A. Paquette, Portage Township, Kalamazoo County, Mich., assignor to The Upjohn Company, Kalamazoo, Mich., a corporation of Delaware
No Drawing. Filed Feb. 12, 1963, Ser. No. 257,875
6 Claims. (Cl. 260—240)

This invention relates to novel compositions of matter and to methods of preparing the same. It is particularly directed to novel hydrazones of cyclic halovinyl aldehydes and to processes for the preparation of the same.

The novel compounds of the invention have the following formula:

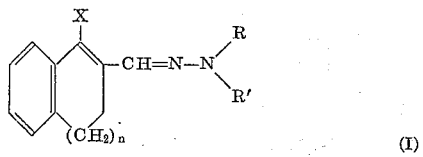

(I)

wherein X is selected from the group consisting of chlorine and bromine, n is an integer from 1 to 2, and R and R′ taken separately are selected from the group consisting of hydrogen and lower-alkyl and together with the nitrogen are saturated heterocyclic amino of 5 to 9 nuclear atoms, inclusive, selected from the group consisting of unsubstituted and mono- and polyalkyl substituted piperidino, morpholino, thiamorpholino, piperazino, pyrrolidino, hexamethyleneimino, heptamethyleneimino octamethyleneimino, and homomorpholino.

The novel compounds of the invention are prepared by reacting a cyclic halovinyl aldehyde having the formula:

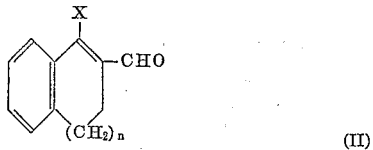

(II)

wherein X and n are as given above, with a hydrazine of the formula

(III)

wherein R and R′ are as given above. Representative hydrazines of the Formula III are hydrazine; loweralkylhydrazines, for example, methyl-, ethyl-, propyl-, butyl-, pentyl-, hexyl, heptyl-, and octylhydrazines and the isomeric forms thereof; N,N-diloweralkylhydrazines, for example, N,N-dimethyl-, N,N-diethyl-, N,N-dipropyl-, N,N-dibutyl-, N,N-dipentyl-, N,N-dihexyl-, N,N-diheptyl-, and N,N-dioctylhydrazines and the isomeric forms thereof, N-methyl-N-ethylhydrazine, N-methyl-N-octylhydrazine, N-butyl-N-hexylhydrazine and the like; 1-aminopiperidine, 1 - amino - 4 - methylpiperazine, 1 - aminohexamethyleneimine, 1 - amino - 3,6 - dimethylhexamethyleneimine, 1-amino-2,2-dibutylhexamethyleneimine, 1-amino - 4 - methylhexamethyleneimine, 1 - aminoheptamethyleneimine, 1 - aminooctamethyleneimine, 4 - aminomorpholine, 4-amino-2-ethylmorpholine, 4-amino-3,5-dimethylmorpholine, 4 - aminohomomorpholine, 4 - aminothiamorpholine, 4 - amino - 2,3,5 - trimethylthiamorpholine, 4 - amino - 2,6 - dimethylthiamorpholine, 1 - amino-2 - butylpiperidine, 1 - amino - 5 - ethyl - 2 - methylpiperidine, 1-amino-4-isopropylpiperidine, 1-aminopyrrolidine, 1 - amino - 2 - butyl - 5 - methylpyrrolidine, 1 - amino-2,5 - diisopropylpyrrolidine, 1 - amino - 4 - butylpiperazine, 1 - amino - 4 - isopropylpiperazine, 1 - amino - 2,4,5 - trimethylpiperazine, 1 - amino - 2 - methylpiperidine, 1 - amino-3 - methylpiperidine, 1 - amino - 4 - methylpiperidine, and 1-amino-4,4-dimethylpiperidine.

The cyclic hydrazines, i.e., compounds of Formula III in which R and R′ together with the nitrogen are saturated heterocyclic amino, can be prepared by the process of Zimmer et al., J. Am. Chem. Soc. 77, 790, 1955, which involves nitrosating a saturated heterocyclic amino compound with nitrous acid (produced in situ, e.g., by means of an alkali-metal nitrite such as sodium nitrite and an acid such as hydrochloric acid) and reducing the resulting N-nitroso saturated heterocyclic amino compound with lithium aluminum hydride. Since nitrosation of piperazine, unsubstituted in the 1 and 4 positions, can occur on both nitrogen atoms, it is generally desirable to utilize 1-benzylpiperazine as a starting compound and to debenzylate the resulting hydrazine with hydrogen in the presence of a palladium catalyst according to the process disclosed in U.S. Patent 2,415,786. The reduction of the N-nitroso compound with lithium aluminum hydride is highly exothermic in many instances. Accordingly, it is good practice to bring the reactants together gradually, such as by gradual addition of a solution of the N-nitroso compound in an inert solvent to the reaction mixture containing the lithium aluminum hydride. The cyclic halovinyl aldehydes of Formula II can be prepared by reacting 3,4-dihydro-1(2H)naphthalenone (α-tetralone) or 6,7,8,9-tetrahydro-5H-cycloheptabenzen-5-one (benzsuberone) with a formylating agent consisting of dimethylformamide and a phosphorus halide such as phosphorus oxychloride or phosphorus oxybromide. See Ziegenbein et al., Chem. Ber. 93, 2743, 1960.

Advantageously, the reaction between the cyclic halovinyl aldehyde of Formula II and the hydrazine of Formula III is carried out in the presence of an inert solvent such as diethyl ether, diisopropyl ether, dioxane, methanol, ethanol, propanol, butanol, and the like. Stoichiometrically the reaction requires equimolar amounts of the aldehyde and the hydrazine, although an excess of either reactant can be employed if so desired (except when the hydrazine is hydrazine itself, in which case any substantial excess of the aldehyde should be avoided). Preferably, the aldehyde and the hydrazine are employed in molar ratios varying from about 1:2 to 2:1, except in the case of hydrazine itself, when molar ratios varying from about 1:2 to 1:1 are preferred. The reaction can be carried out over a wide range of temperature, preferably between about 0° C. and about 125° C., and more particularly between about 20° C. and about 100° C. In many instances, it is very convenient to carry out the reaction at the reflux temperature of the inert solvent. The time required for completing the reaction will of course depend on the temperature at which the reaction is conducted and the reactivity of the particular reactants; generally speaking, reaction times varying from about 1 hour to about 24 hours suffice. Upon completion of the reaction, the desired hydrazone of Formula I can be isolated and purified by conventional procedures, e.g., filtration of the reaction mixture followed by recrystallization of the product thus obtained.

The novel cyclic halovinyl aldehyde hydrazones of Formula I exist either in the nonprotonated (free base) form or the protonated form depending on the pH of the environment. They form stable protonates (acid addition salts) or treatment with inorganic and organic acids, for example, hydrochloric, hydrobromic, sulfuric, phosphoric, nitric, thiocyanic, fluosilicic, acetic, benzoic, salicylic, glycolic, succinic, tartaric, citric, malic, maleic, lactic, methanesulfonic, cyclohexanesulfamic acids, and the like. Such acid addition salts are useful in upgrading the free bases. The thiocyanates, when condensed with formaldehyde, form resinous materials useful as pickling inhibitors according to U.S. Patents 2,425,320 and 2,606,155. The fluosilicates are useful as mothproofing agents according to U.S. Patents 1,915,334 and 2,075,359.

The novel compounds of the invention have central nervous system depressant activity and anti-inflammatory activity and can be used for effecting sedation in and for allaying inflammation in mammals, birds, and other animals; preferably they are used for these purposes in the free base form or as pharmacologically acceptable acid addition salts such as hydrochlorides, hydrobromides, sulfates, phosphates, nitrates, acetates, benzoates, salicylates, glycolates, succinates, tartrates, citrates, malates, maleates, lactates, methanesulfonates, cyclohexanesulfamates, and the like.

The invention may be more fully understood by reference to the following illustrative examples in which the parts and percentages are by weight unless otherwise specified.

*Example 1.—1-Chloro-3,4-Dihydro-2-Naphthaldehyde Hydrazone*

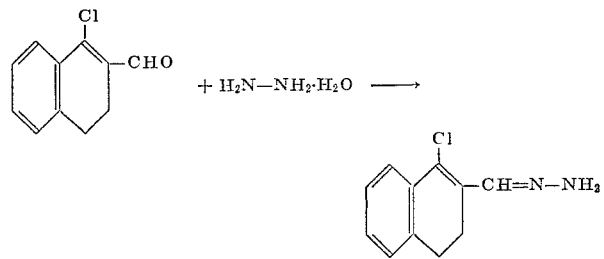

A solution of 57.2 g. (0.30 mole) of 1-chloro-3,4-dihydro-2-naphthaldehyde in 500 ml. of diethyl ether was treated dropwise with 16.0 g. (0.32 mole) of hydrazine hydrate with stirring and intermittent cooling to maintain the temperature at 20–30° C. The resulting mixture was stirred at about 25° C. under nitrogen for 24 hrs. The yellow solid was filtered and dried to give 55.3 g. of a fluffy product, M.P. 100–102° C. Three recrystallizations of this material from ligroin gave pure 1-chloro-3,4-dihydro-2-naphthaldehyde hydrazone as white needles, M.P. 106–106.5° C.

*Analysis.*—Calcd. for $C_{11}H_{11}ClN_2$: C, 63.92; H, 5.37; N, 13.56; Cl, 17.15. Found: C, 63.68; H, 5.56; N, 13.51; Cl, 16.63.

*Example 2.—9-Chloro-6,7-Dihydro-5H-Benzocycloheptene-8-Carboxaldehyde Hydrazone*

Following the procedure of Example 1, substituting the 1-chloro-3,4-dihydro-2-naphthaldehyde by 9-chloro-6,7-dihydro-5H-benzocycloheptene-8-carboxaldehyde, there was obtained 9-chloro-6,7-dihydro-5H-benzocycloheptene-8-carboxaldehyde hydrazone.

*Example 3.—1-Chloro-3,4-Dihydro-2-Naphthaldehyde Dimethylhydrazone and Hydrochloride Thereof*

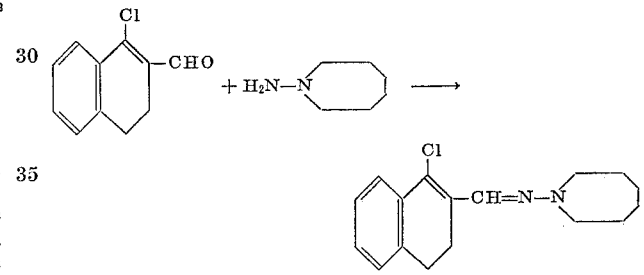

A solution of 9.6 g. (0.05 mole) of 1-chloro-3,4-dihydro-2-naphthaldehyde and 6.0 g. (0.10 mole) of N,N-dimethylhydrazine in 50 ml. of diethyl ether was stirred under nitrogen overnight at about 25° C. The solution was refluxed for 1 hr. and the solvent was removed under reduced pressure to give 1-chloro-3,4-dihydro-2-naphthaldehyde dimethylhydrazone as an oil which was converted to its hydrochloride by dissolution in ether and addition of a slight excess of an ethereal hydrogen chloride solution to give, after drying, 11.8 g. of pale yellow solid, M.P. 139–142° C. Three recrystallizations of this material from ethanol-ether gave pure 1-chloro-3,4-dihydro-2-naphthaldehyde dimethylhydrazone hydrochloride as a fluffy white solid, M.P. 144–145° C.

*Analysis.*—Calcd. for $C_{13}H_{16}Cl_2N_2$: C, 57.57; H, 5.95; N, 10.33. Found: C, 57.61; H, 5.72; N, 10.24.

*Example 4.—9-Chloro-6,7-Dihydro-5H-Benzocycloheptene-8-Carboxaldehyde Dimethylhydrazone and Hydrochloride Thereof*

Following the procedure of Example 3, substituting the 1-chloro-3,4-dihydro-2-naphthaldehyde by 9-chloro-6,7-dihydro-5H-benzocycloheptene-8-carboxaldehyde, there was obtained 9-chloro-6,7-dihydro-5H-benzocycloheptene-8-carboxaldehyde dimethylhydrazone and its hydrochloride.

By substituting the N,N-dimethylhydrazine of Examples 3 and 4 by the loweralkylhydrazines and the N,N-diloweralkylhydrazines enumerated above, there are obtained the corresponding hydrazones and hydrazone hydrochlorides of 1-chloro-3,4-dihydro-2-naphthaldehyde and 9-chloro-6,7-dihydro-5H-benzocycloheptene-8-carboxaldehyde.

*Example 5.—1-[(1-Chloro-3,4-Dihydro-2-Naphthyl)Methyleneamino]Hexamethyleneimine and Hydrochloride Thereof*

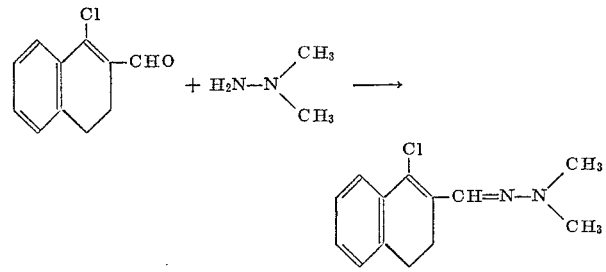

A solution of 5.2 g. (0.025 mole) of 1-chloro-3,4-dihydro-2-naphthaldehyde and 2.86 g. (0.025 mole) of 1-aminohexamethyleneimine in 50 ml. of ethanol was refluxed for 3 hrs. The solvent was removed under reduced pressure to yield 1-[(1-chloro-3,4-dihydro-2-naphthyl)methyleneamino]hexamethyleneimine as an oil. The oil was dissolved in diethyl ether and treated with a slight excess of an ethereal hydrogen chloride solution. The precipitated solid was filtered and dried to give 8.1 g. of pale yellow solid, M.P. 147–150° C. Four recrystallizations of this material from ethanol-ether gave pure 1-[(1-chloro-3,4-dihydro-2-naphthyl)methyleneamino]hexamethyleneimine hydrochloride as pale yellow platelets, M.P. 151–152° C. (dec.).

*Analysis.*—Calcd. for $C_{17}H_{22}Cl_2N_2$: C, 62.77; H, 6.82; N, 8.61. Found: C, 62.90; H, 6.84; N, 8.90.

*Example 6.—1-[(9-Chloro-6,7-Dihydro-5H-Benzocyclohepten-8-yl)Methyleneamino]Hexamethyleneimine and Hydrochloride Thereof*

Following the procedure of Example 5, substituting the 1-chloro-3,4-dihydro-2-naphthaldehyde by 9-chloro-6,7-dihydro-5H-benzocycloheptene-8-carboxaldehyde, there was obtained 1-[(9-chloro-6,7-dihydro-5H-benzocyclohepten-8-yl)methyleneamino]hexamethyleneimine and the hypdrochloride thereof.

By substituting the 1-aminohexamethyleneimine of Examples 5 and 6 by 1-aminopiperidine, 1-amino-4-methylpiperazine, 1-amino-3,6-dimethylhexamethyleneimine, 1-amino-2,2-dibutylhexamethyleneimine, 1-amino-4-methylhexamethyleneimine, 1-aminoheptamethyleneimine, 1-aminooctamethyleneimine, 4-aminomorpholine, 4-amino-2-ethylmorpholine, 4-amino-3,5-dimethylmorpholine, 4-aminohomomorpholine, 4-aminothiamorpholine, 4-amino-2,3,5-trimethylthiamorpholine, 4-amino-2,6-dimethylthiamorpholine, 1-amino-2-butylpiperidine, 1-amino-5-ethyl-2-methylpiperidine, 1-amino-4-isopropylpiperidine, 1-aminopyrrolidine, 1-amino-2-butyl-5-methylpyrrolidine, 1-amino-2,5-diisopropylpyrrolidine, 1-amino-4-butylpiperazine, 1-amino-4-isopropylpiperazine, 1-amino - 2,4,5 - trimethylpiperazine, 1 - amino - 2 - methylpiperidine, 1-amino-3-methylpiperidine, 1-amino-4-methylpiperidine, and 1-amino-4,4-dimethylpiperidine, there are obtained the corresponding hydrazones and hydrazone hydrochlorides of 1-chloro-3,4-dihydro-2-naphthaldehyde and 9-chloro-6,7-dihydro - 5H - benzocycloheptene-8-carboxaldehyde.

By substituting 1-bromo-3,4-dihydro-2-naphthaldehyde and 9-bromo - 6,7 - dihydro-5H-benzocycloheptene-8-carboxaldehyde in the foregoing examples, there are obtained corresponding hydrazones and hydrazone hydrochlorides of these aldehydes.

I claim:
1. A member of the class consisting of a compound of the formula:

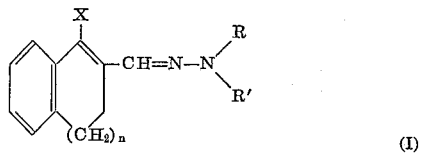

wherein X is selected from the group consisting of chlorine and bromine, $n$ is an integer from 1 to 2, and R and R' taken separately are selected from the group consisting of hydrogen and loweralkyl and together with the nitrogen are saturated heterocyclic amino selected from the group consisting of unsubstituted and mono- and polyalkyl substituted piperidino, morpholino, thiamorpholino, piperazino, pyrrolidino, hexamethyleneimino, heptamethyleneimino, octamethyleneimino, and homomorpholino wherein each alkyl is of from 1 to 4 carbon atoms, inclusive, and the addition salts thereof.

2. 1-chloro-3,4-dihydro-2-naphthaldehyde hydrazone.
3. 1-chloro-3,4-dihydro-2-naphthaldehyde dimethylhydrazone.
4. 1-chloro-3,4-dihydro-2-naphthaldehyde dimethylhydrazone hydrochloride.
5. 1-[(1-chloro - 3,4 - dihydro-2-naphthyl)methyleneamino]hexamethyleneimine.
6. 1-[(1-chloro - 3,4 - dihydro-2-naphthyl)methyleneamino]hexamethyleneimine hydrochloride.

References Cited in the file of this patent

UNITED STATES PATENTS 3,047,572 Craig _____ July 31, 1962
3,081,305 Jacob et al. _____ Mar. 12, 1963

OTHER REFERENCES

Chemical Abstracts, vol. 52, Col. 10,982 (1958), QD 1A51 [Abstract of Petru et al.—Chim. Listy., vol. 52, pages 353–5 (1958)].

Ziegenbein et al. Chem. Ber., vol. 93, pages 2743–2749 (1960).

Byrkit et al.: Industrial and Engineering Chemistry, vol. 42, pages 1862 to 1864 (1950).

Elsevier's Encyclopedia of Organic Chemistry: vol. 12B, pages 2305–2307, Elsevier Publishing Co., Inc., New York, New York (1950).